United States Patent [19]

Izawa

[11] Patent Number: 5,923,332
[45] Date of Patent: Jul. 13, 1999

[54] IMAGE PROCESSING DEVICE

[75] Inventor: Yasuhiro Izawa, Sanda, Japan

[73] Assignee: Ricoh Company, Ltd., Tokyo, Japan

[21] Appl. No.: 08/676,556

[22] Filed: Jul. 8, 1996

[30] Foreign Application Priority Data

Jul. 10, 1995 [JP] Japan .................................... 7-197080

[51] Int. Cl.⁶ .............................................. G06F 15/00
[52] U.S. Cl. .......................................... 345/421; 345/423
[58] Field of Search .................................... 345/421, 422, 345/430, 423

[56] References Cited

U.S. PATENT DOCUMENTS

| | | | |
|---|---|---|---|
| 4,658,247 | 4/1987 | Gharachorloo . | |
| 5,220,646 | 6/1993 | Fossum | 345/422 |
| 5,249,264 | 9/1993 | Matsumoto | 345/434 |
| 5,293,467 | 3/1994 | Buchner et al. | 345/422 |
| 5,307,450 | 4/1994 | Grossman | 345/423 |
| 5,329,613 | 7/1994 | Brase et al. | 345/422 |
| 5,459,822 | 10/1995 | Izawa et al. | 345/422 |

FOREIGN PATENT DOCUMENTS

| | | |
|---|---|---|
| 63-80374 | 4/1988 | Japan . |
| 3156686 | 7/1991 | Japan . |
| 5298456 | 11/1993 | Japan . |

OTHER PUBLICATIONS

Foley et al., "Viewing in 3D", Computer Graphics: Principles and Prctice, pps. 229–258, 258–260, 268–271, and fig. 6.59, 1996.

"Modeling—Various Methods for Expressing Objects" written by Ohta et al., "Applied Graphics" published by ASCII Co. Ltd., p. 64, Nov. 1, 1987.

The journal Pixel (No. 73), published by the figure Information Processing Center on Oct. 1, 1988, "Introduction to Real Video Production Through CG", written by Yoshio Ohno, pp. 87–91 and picture sheet.

"Visibility Ordering Meshed Polyhedra" ACM Transactions on Graphics, vol. 11, No. 2, Apr. 1992, pp. 103–126.

*Primary Examiner*—Mark K. Zimmerman
*Assistant Examiner*—Motilewa Good-Johnson
*Attorney, Agent, or Firm*—Cooper & Dunham LLP

[57] ABSTRACT

A device for creating an image representing a three-dimensional scene of objects includes a conversion unit which divides a Z axis into a plurality of segments to create a plurality of spaces and converts view-point coordinates of the objects into perspective coordinates for each of the plurality of spaces. The device further includes a hidden-surface processing unit for carrying out hidden-surface processing based on a Z-buffer method by using the perspective coordinates of the objects to create the image.

10 Claims, 7 Drawing Sheets

IMAGE PROCESSING DEVICE

BACKGROUND OF THE INVENTION

1. Field of the Invention

The present invention generally relates to image processing devices, and particularly relates to an image processing device which carries out a hidden-surface processing based on a Z-buffer method.

2. Description of the Related Art

Hidden-surface processing is a necessary process to be carried out in implementation of 3-dimensional graphics. Various schemes based on a Z-buffer method have been proposed to carry out the hidden-surface processing. A reference for the Z-buffer method may be made to "Algorithm of the Z-buffer Method" (PIXEL, No.73, pp88–89).

An algorithm disclosed in this reference is based on generation of a 3-dimensional image of objects by updating a color of each pixel stored in a frame buffer when an object (polygon) to be drawn should be visible from a viewpoint and not updating the color of each pixel when the object (polygon) should be hidden behind another object.

In detail, such a hidden-surface processing based on the Z-buffer method generates a 3-dimensional image by carrying out a buffer-initialization process, a coordinate-conversion process, a clipping process, a perspective-conversion process, and a scan-conversion process.

<Buffer-Initialization>

The buffer-initialization process is a necessary step to define the color of a background of a scene created by a computer. In this process, each pixel of a frame buffer is initialized to a black color or to the color of the background, and a value representing an infinite distance is stored in each pixel of the Z buffer. When a range of depth is normalized to extend from 0 to 1, for example, each pixel of the Z buffer is provided with a value of 1.

<Coordinate-Conversion Process>

The coordinate-conversion process is a necessary step to arrange each object at appropriate positions within the scene. In this process, local coordinates (i.e., modeling coordinates or body coordinates) of each component, i.e., apex coordinates of polygons constituting each object, are rotated, shifted, size-reduced, and/or enlarged to be converted into coordinates of the scene (world coordinates). Then, coordinates of each component represented in the world coordinates are converted into viewpoint coordinates so that polygon coordinates of each object as being viewed from a certain viewpoint are created.

<Clipping Process>

The clipping process cuts off a portion of each object if this portion extends beyond the frame limit of a screen when the polygon coordinates of each object represented in the viewpoint coordinates are projected onto this screen.

FIG. 1 is an illustrative drawing for explaining which points of the viewpoint coordinates should be in the screen and which points should be cut off from the screen.

In FIG. 1, any point within a 3-dimensional range defined by six clipping plane should be seen from the viewpoint as being within the screen, and this 3-dimensional range is called a view volume. Polygon coordinates of the objects inside this view volume remain, and polygon coordinates of the objects outside this view volume are cut off.

<Perspective-Conversion Process>

Each component projected onto the screen should appear to be in a correct size for its distance from the viewpoint. The perspective-conversion process makes a component closer to the viewpoint appear to be larger, and makes a component further from the viewpoint appear to be smaller. In order to have this effect on appearance, the perspective-conversion process first obtains parameters x, y, z, and w as follows.

$$\begin{bmatrix} X \\ Y \\ Z \\ W \end{bmatrix} = \begin{bmatrix} 1 & 0 & 0 & 0 \\ 0 & 1 & 0 & 0 \\ 0 & 0 & A & B \\ 0 & 0 & C & 0 \end{bmatrix} \cdot \begin{bmatrix} X_e \\ Y_e \\ Z_e \\ 1 \end{bmatrix} \quad (1)$$

$X_e$: X coordinate in the viewpoint coordinates
$Y_e$: Y coordinate in the viewpoint coordinates
$Z_e$: Z coordinate in the viewpoint coordinates
A, B, C: constant value Then, the following calculations are conducted to obtain the polygon coordinates in perspective coordinates.

$$X_s = X/W \quad (2)$$
$$Y_s = Y/W$$
$$Z_s = Z/W$$

$X_s$: X coordinate in the perspective coordinates
$Y_s$: Y coordinate in the perspective coordinates
$Z_s$: Z coordinate in the perspective coordinates If the distance from the viewpoint to the screen is d, the constant values used in the equation (1) are typically represented as:

$$A = 0 \quad (3)$$
$$B = 1$$
$$C = 1/d$$

FIGS. 2A through 2C are illustrative drawing for explaining the need for the Z coordinate to be converted into the perspective coordinate. FIG. 2A shows line segments a and b arranged nearby in the viewpoint coordinates. An arrangement of two line segments a and b shown in FIG. 2A turns into an arrangement shown in FIG. 2B when the viewpoint coordinates are converted into the perspective coordinates only with respect to the X coordinate and the Y coordinate. As shown in FIG. 2B, lines are not converted into lines, and planes are not converted into planes.

When two end points of the line segment are linearly interpolated as shown by a dashed line in FIG. 2B, an interpolated line segment a' (dashed line) ends up residing in the back of the line segment b when viewed from the view point. That is, the spatial arrangement of the interpolated line segment a' and the line segment b is reversed from the spatial arrangement of the line segment a and the line segment b. Linear interpolation is intensively employed in the scan conversion process, as will be described later, so that such a reversion of spatial arrangement is not desirable.

Thus, the Z coordinate should also be converted into the perspective coordinates as defined by the equation (1), and a result of this conversion is shown in FIG. 2C. As shown in FIG. 2C, when the coordinate conversion is applied to all the X, Y, and Z coordinates, lines are converted into lines, and planes are converted into planes.

Because of the conversion into the perspective coordinates, the Z coordinate becomes coarser at a point closer to the viewpoint, and becomes denser at a point further from the viewpoint. As a result, accuracy deterioration may become a problem. When there is a need to keep the accuracy from deteriorating, the constant values used in the equation (1) are obtained as follows, instead of using the equation (3).

$$A = C_{z+} / \{d \cdot (C_{z+} - C_{z-})\} \qquad (4)$$
$$B = -(C_{z+} \cdot C_{z-}) / \{d \cdot (C_{z+} - C_{z-})\}$$
$$C = 1/d$$

In this manner, a Z value is normalized between 0 and 1, and a range of the view volume in a depth direction is made as narrow as possible to avoid the above-identified problem.

<Scan-Conversion Process>

The scan-conversion process creates surfaces of polygons constituting objects by painting interiors of the polygons based on polygon-edge information derived from the polygon coordinates.

FIG. 3 is an illustrative drawing for explaining the painting of a polygon interior.

The painting of a polygon interior comprises a two step process, i.e., one for the vertical direction (Y direction) and the other for the lateral direction (X direction). First, two adjacent apexes are interpolated based on Y values to create an edge between these two apexes. After left edges and right edges are created, X values and Z values are obtained for pixels located at intersections between these edges and each scan line (lateral line passing through centers of pixels horizontally arranged). Then, pixels having X values ranging between the X value of the left edge and the X value of the right edge are selected from the pixels arranged on a current scan line. Then, Z values of the left edge and the right edge are interpolated to obtain Z values of the selected pixels. Finally, while the hidden-surface processing is being carried out, a shading calculation obtains colors of the selected pixels to paint these pixels.

After the processing of the last pixel is finished, a color of each pixel stored in the frame buffer is read out in a raster direction to be supplied to a D/A converter circuit. Then, an image is displayed on the CRT.

The Z-buffer method described above and disclosed in the above-cited publication has the following problems.

As can be seen from the equations (1), (2), and (4), the Z values must be normalized between 0 and 1 with the application of the perspective conversion.

$$Z_s = Z/W = CZB/(CZB-CZF) \cdot (1-CZF/Z_e) \qquad (5)$$

$Z_s$: Z value on the perspective coordinates
$Z_e$: Z value on the viewpoint coordinates
W: parameter
CZF: Z value of the front clip plane ($=C_{z-}$)
CZB: Z value of the back clip plane ($=C_{z+}$)

When a distance between the Z value CZF of the front clip plane and the Z value CZB of the back clip plane is large, however, Z values of each polygon viewed from the viewpoint have little change in a further region despite a larger change in a closer region.

FIG. 4 is a chart showing a relation between a Z value of the viewpoint coordinates and a Z value of the perspective coordinates. As shown in FIG. 4, a Z value of the perspective coordinates does not have much change in a further or distanced region. Because of this, a comparison of Z values does not make sense in the further or distanced region.

In order to obviate this problem, the number of bits for representing Z values may be increased to make sense to compare Z values even at a further, distanced region. Such a method, however, will increase the volume of the Z-buffer memory.

In response, the Japanese Patent Laid-open Application No.3-156686 discloses a circuit which counters this problem. FIG. 5 is a diagram of the circuit of this publication.

The circuit of this publication does not suffer from a deteriorated accuracy caused by coarser Z values in a closer region and denser Z values in a further region when the hidden-surface processing using the Z buffer is carried out. The circuit of FIG. 5 includes a logarithm-conversion unit 104 and a Z-buffer-memory unit 105. The logarithm-conversion unit 104 includes a multiplier 101, an adder 102, and a multiplier 103. The Z-buffer-memory unit 105 includes a read-out register 106, a Z-buffer memory 107, a comparator 108, and a write-in register 109.

The logarithm-conversion unit 104 converts a Z value of each pixel into a logarithmic scale, and supplies the converted value to the Z-buffer-memory unit 105. The read-out register 106 reads out a Z value of the same pixel from the Z-buffer memory 107. The comparator 108 compares the Z values of the same pixel with each other. The write-in register 109 writes the smallest one of the Z values in the Z-buffer memory 107. That is, the Z value which should be seen from the viewpoint remains.

In the circuit of FIG. 5, the Z values after the logarithmic conversion by the logarithm-conversion unit 104 are compared for the same pixel (same address) by the Z-buffer-memory unit 105. Thus, it is possible to compensate for the inherent characteristic of the Z value as having a deteriorated accuracy caused by a coarser distribution in a closer region and a denser distribution in a further region. Thus, a higher accuracy is achieved even with a small number of bits for representing the Z value, thereby reducing the volume of the Z-buffer memory 107.

The method of using the logarithmic conversion such as used in this circuit tends to make the Z values distribute coarser in the entire range of the depth direction without a specific focus on a further or distanced region. Thus, this method does not have sufficient effect to make a coarser distribution in the distanced region. In other words, the method of using the logarithmic conversion is not sufficiently effective in making a coarser distribution of the Z values in the entire depth range.

Accordingly, there is a need for an image processing device which can make a coarse distribution of Z values in the entire depth range without increasing the number of bits for representing the Z values, and can convert lines into lines and planes into planes when polygon coordinates are converted from the viewpoint coordinates to the perspective coordinates, so that an accurate and high-speed comparison can be conducted without increasing the volume of the Z-buffer memory.

SUMMARY OF THE INVENTION

Accordingly, it is a general object of the present invention to provide an image processing device which can satisfy the need described above.

It is more specific and another object of the present invention to provide an image processing device which can make a coarse distribution of Z values in the entire depth range without increasing the number of bits for representing the Z values, and can convert lines into lines and planes into planes when polygon coordinates are converted from the viewpoint coordinates to the perspective coordinates, so that an accurate and high-speed comparison can be conducted without increasing the volume of the Z-buffer memory.

In order to achieve the above objects according to the present invention, a device for creating an image representing a three-dimensional scene of objects includes a conversion unit which divides a Z axis into a plurality of segments to create a plurality of spaces and converts view-point coordinates of the objects into perspective coordinates for each of the plurality of spaces. The device further includes a hidden-surface processing unit for carrying out hidden-surface processing based on a Z-buffer method by using the perspective coordinates of the objects to create the image.

In the device described above, the view-point coordinates of the objects are converted into the perspective coordinates for each of the spaces, i.e., the Z values of the objects are converted from the view-point coordinates to the perspective coordinates, so that lines are converted into lines and planes are converted into planes while the Z values are coarsely distributed throughout the entire depth range. Thus, an accurate and high-speed comparison can be conducted without increasing the volume of the Z-buffer memory.

Other objects and further features of the present invention will be apparent from the following detailed description when read in conjunction with the accompanying drawings.

DETAILED DESCRIPTION OF THE PREFERRED EMBODIMENTS

In the following, an embodiment of the present invention will be described with reference to the accompanying drawings.

Figure 6:
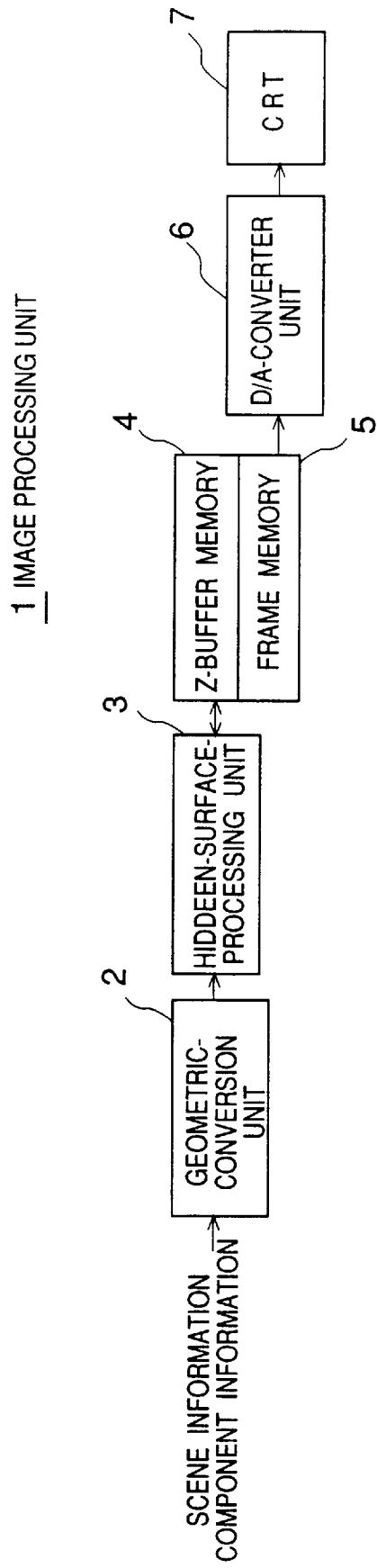
FIG. 6 is a block diagram of an image processing device according to an embodiment of the present invention.

FIG. 6 is a block diagram of an image processing device 1 according to an embodiment of the present invention.

The image processing device 1 of FIG. 6 includes a geometric-conversion unit 2, a hidden-surface-processing unit 3, a Z-buffer memory 4, and a frame memory 5. The image processing device 1 receives scene information indicating contents of a scene and information on each component constituting the scene. Based on the received information, the image processing device 1 successively carries out the buffer-initialization process, the coordinate-conversion process, the clipping process, the perspective-conversion process, and the scan-conversion process to create a 3-dimensional image of objects. This image is supplied to a D/A-converter unit 6. Then, the image is displayed on a CRT (display) 7.

The geometric-conversion unit 2 receives the scene information indicating contents of the scene and the information on each component constituting the scene, and successively carries out the buffer-initialization process, the coordinate-conversion process, the clipping process, and the perspective-conversion process based on the received information. When conducting the perspective-conversion process, the geometric-conversion unit 2 divides the Z coordinate of the viewpoint coordinates in the Z-axis direction.

Figure 7:
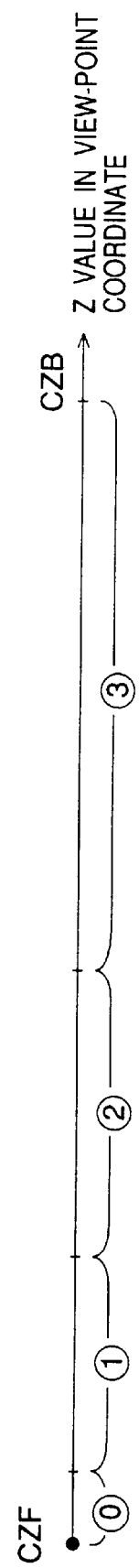
FIG. 7 is an illustrative drawing showing the dividing of the Z coordinates.

FIG. 7 is an illustrative drawing showing the division of the Z coordinate. As shown in FIG. 7, the Z coordinate is divided into a plurality of segments. There is no restrictive rule as to how to divide the Z coordinates and how many segments it is divided into. Then, the Z value is converted from the viewpoint coordinates to the perspective coordinates with normalization for each space of the divided segments.

Figure 8:
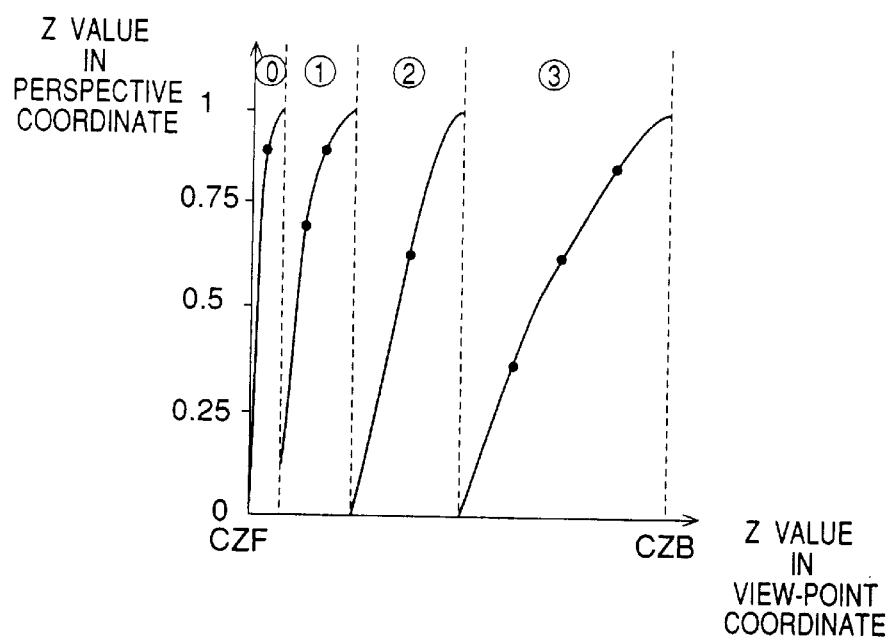
FIG. 8 is a chart showing the perspective conversion and normalization for each space of divided Z-axis segments.

FIG. 8 is a chart showing the perspective conversion and the normalization for each space of the divided segments. In FIG. 8 as well as FIG. 7, the Z coordinate is divided into four segments corresponding to four spaces numbered 0 through 3.

For the front most space (space 0), the Z value CZF of the front clip plane is used in the equation (5), and the largest Z value within this space 0 is used as the Z value CZB of the back clip plane in the equation (5).

For the next to front most space (space 1), the smallest Z value within the space 1 is used as the Z value CZF of the front clip plane in the equation (5), and the largest Z value within the space 1 is used as the Z value CZB of the back clip plane in the equation (5).

For the space (space 2) next to the back most space (space 3), the smallest Z value within the space 2 is used as the Z value CZF of the front clip plane in the equation (5), and the largest Z value within the space 2 is used as the Z value CZB of the back clip plane in the equation (5). For the back most space (space 3), the smallest Z value within the space 3 is used as the Z value CZF of the front clip plane in the equation (5), and the largest Z value within the space 3 is used as the Z value CZB of the back clip plane in the equation (5).

Figure 9:
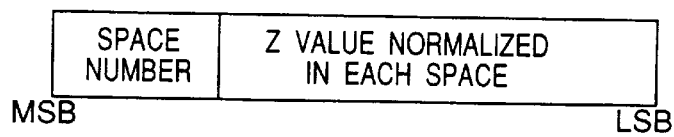
FIG. 9 is an illustrative drawing showing a data structure of a Z value normalized with the perspective-conversion process.

FIG. 9 is an illustrative drawing showing a data structure of a Z value normalized with the perspective-conversion process. As shown in FIG. 9, the Z value normalized with the perspective-conversion process is provided with a space number on the side of the most significant bit (MSB) of the data structure. That is, the space number and the normalized Z value are put together to represent a point in the perspective coordinates. When the space number is represented by using three bits, for example, the most significant bit and the next two bits of the data structure are used for representing the space number, and the remaining bits of the data structure are used for representing the normalized Z value. Here, this space number indicates in which space the perspective conversion and the normalization are carried out. In this manner, the Z values of the perspective coordinates can be matched with the Z values of the viewpoint coordinates.

Figure 1:
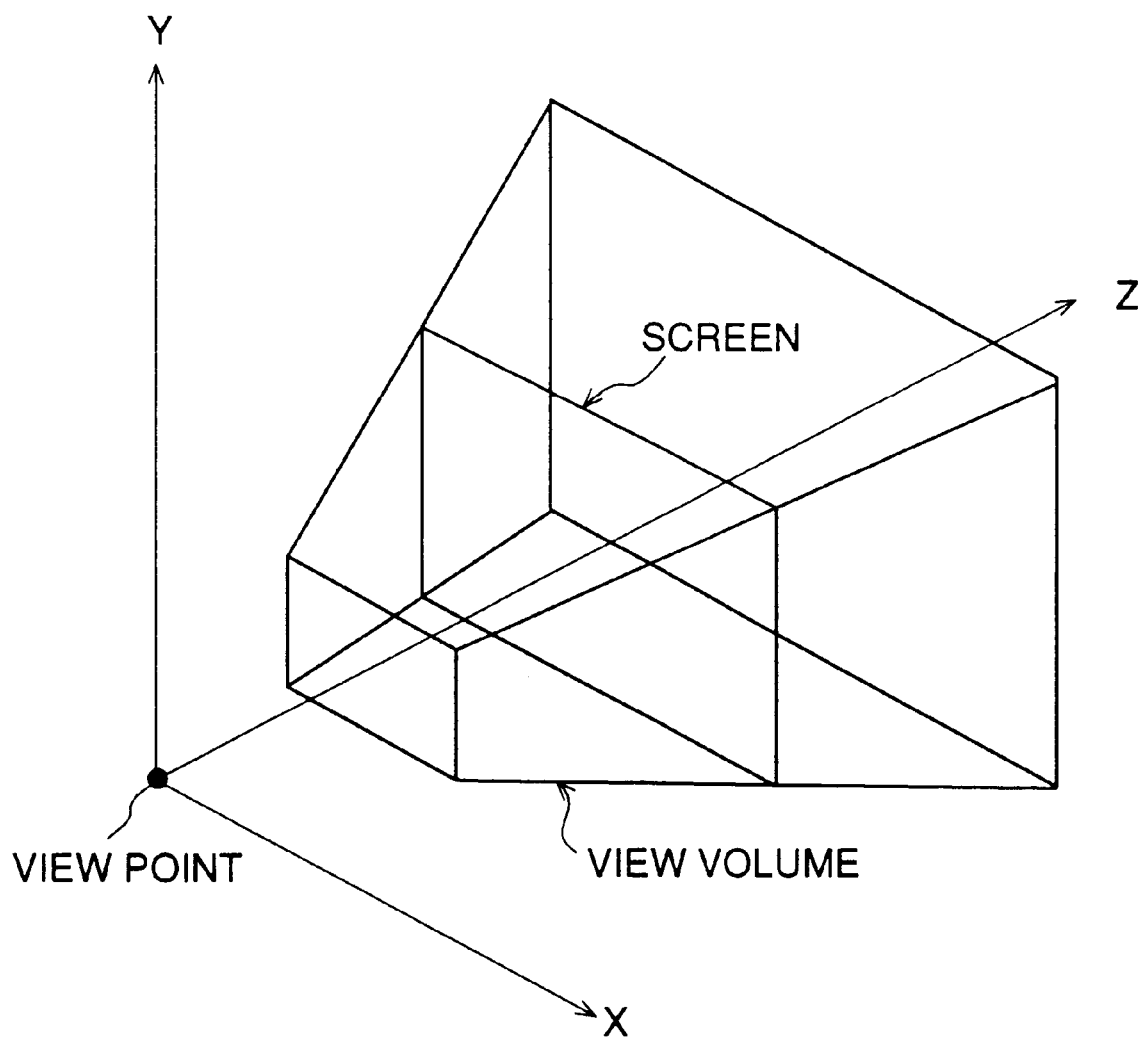
FIG. 1 is an illustrative drawing for explaining which points of viewpoint coordinates should be projected onto a screen and which points should be cut off from the screen.
Figure 2A:
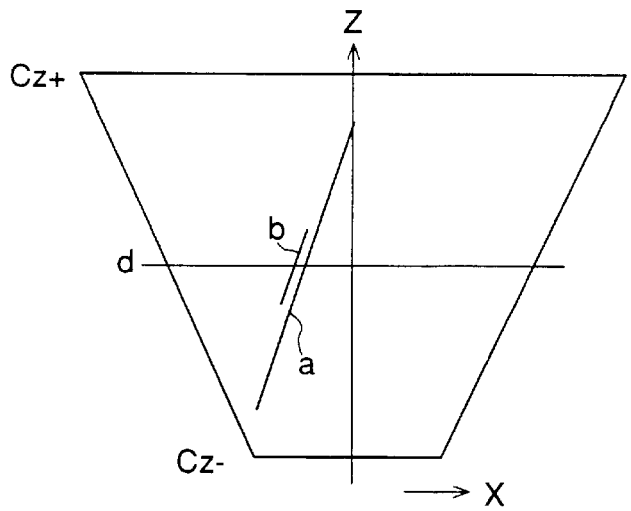
FIGS. 2A through 2C are illustrative drawing for explaining a need for Z coordinates to be converted into perspective coordinates.
Figure 2B:
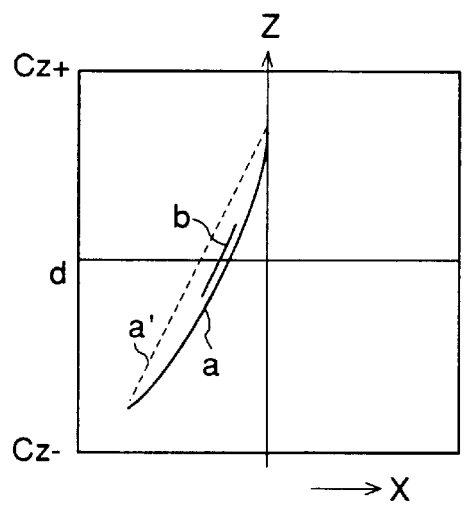
Figure 2C:
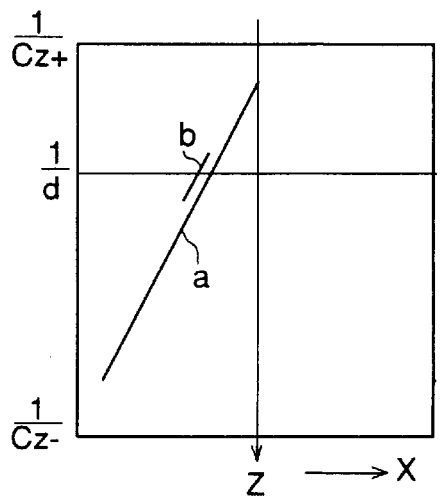
Figure 3:
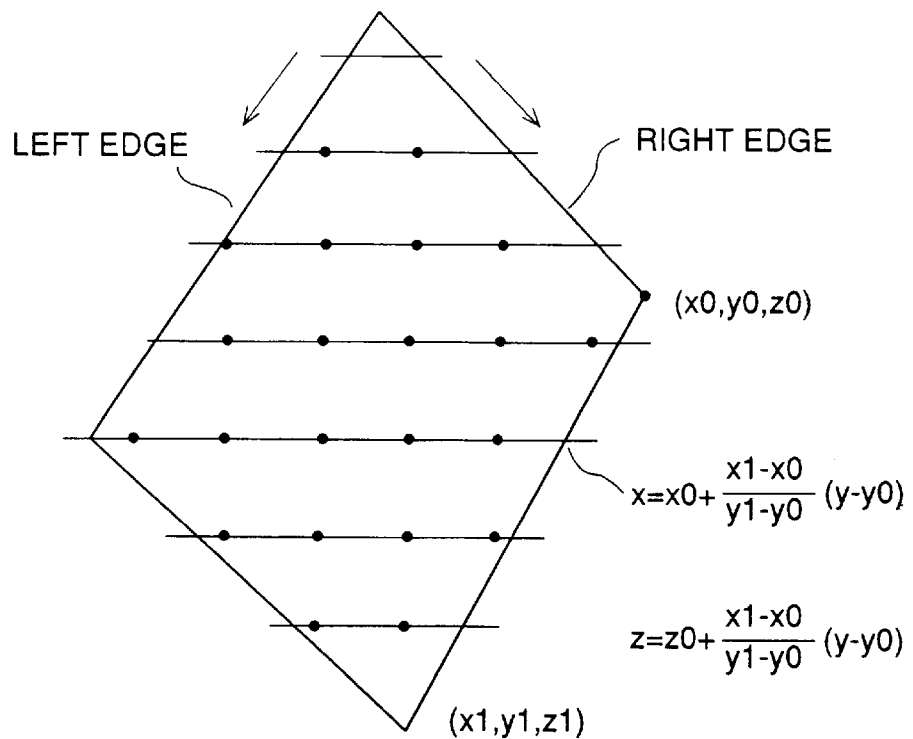
FIG. 3 is an illustrative drawing for explaining the painting of a polygon interior.
Figure 4:
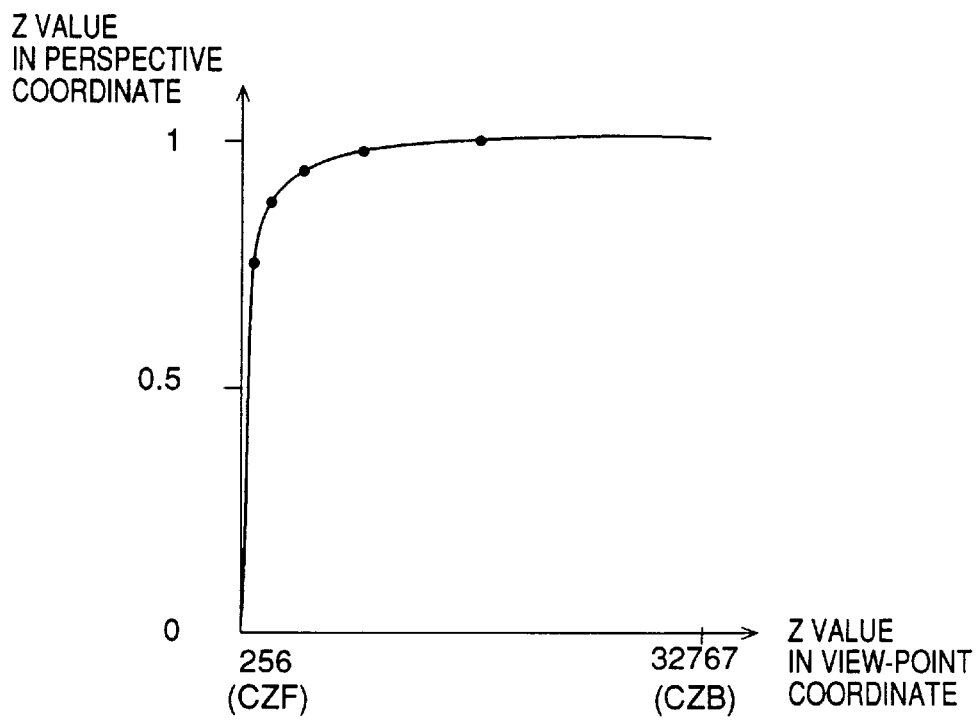
FIG. 4 is a chart showing a relation between a Z value of the viewpoint coordinates and a Z value of the perspective coordinates.
Figure 5:
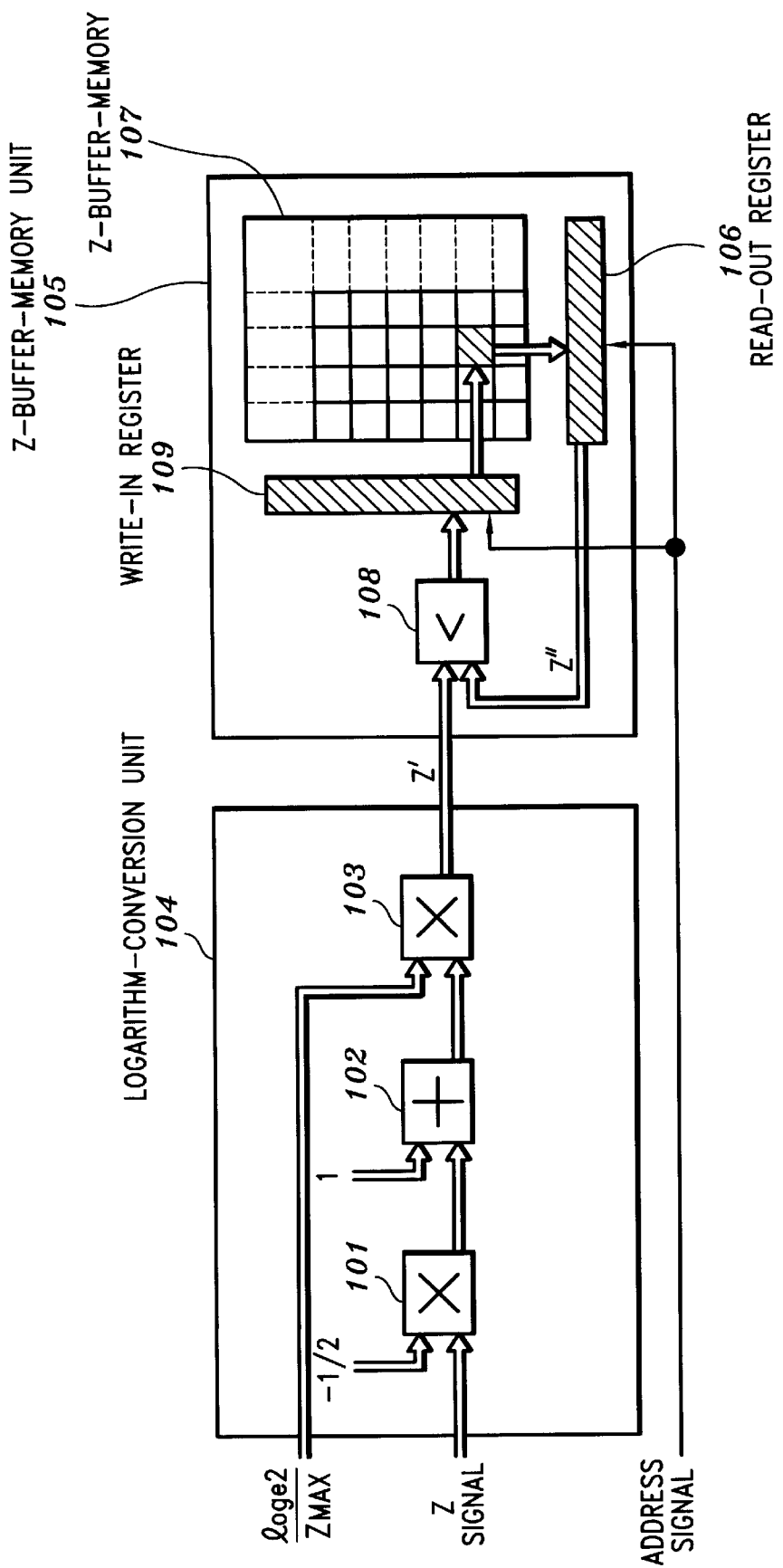
FIG. 5 is a circuit diagram of a prior-art circuit for using a logarithmic conversion in a coordinate-conversion process.
Figure 10:
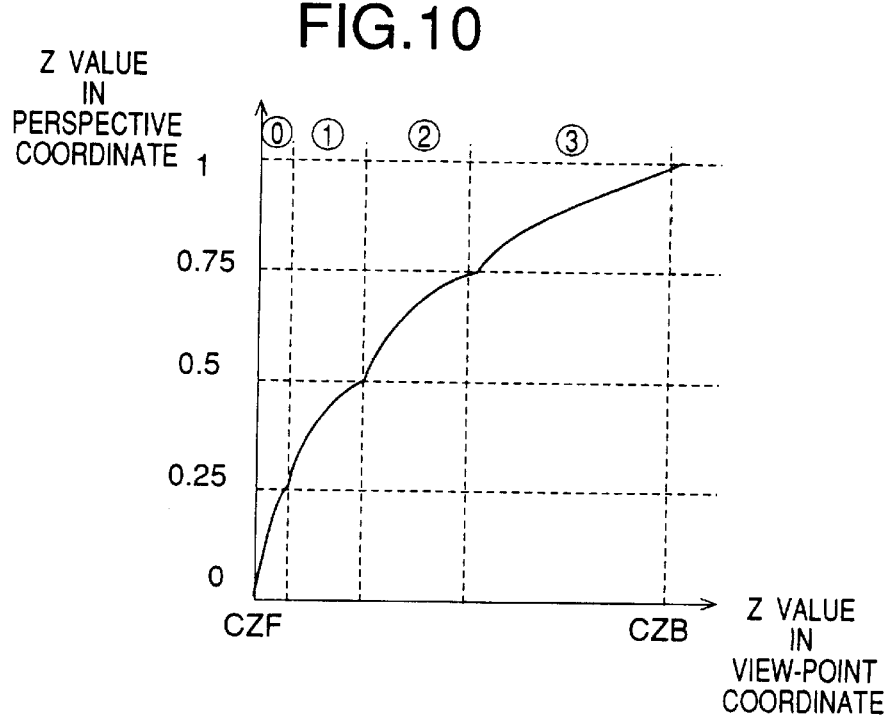
FIG. 10 is a chart showing a relation between values of the perspective coordinates and Z values of the viewpoint coordinates.

FIG. 10 is a chart showing a relation between the values of the perspective coordinates and the Z values of the viewpoint coordinates. As shown in FIG. 10, the Z values of the perspective coordinates for each of the divided spaces can be appropriately matched with the Z values of the viewpoint coordinates by using the space number. As can be seen from the comparison of FIG. 10 with FIG. 4, a distribution of the Z values are coarse even in a region most distant from the viewpoint. Therefore, it makes sense and is easy to compare Z values with each other even in the most distant region.

The hidden-surface-processing unit 3 receives polygon coordinates of the perspective coordinates from the geometric-conversion unit 2, and carries out the hidden-surface processing on the polygon coordinates based on the Z-buffer method using the Z-buffer memory 4. Through the hidden-surface processing, the hidden-surface-processing unit 3 creates an image, and stores it in the frame memory 5. In detail, the hidden-surface-processing unit 3 receives pixel information about each object from the geometric-conversion unit 2, and reads out a Z value of each pixel from the frame memory 5 to compare this Z value with that provided from the geometric-conversion unit 2. The smallest Z value which should be visible from the viewpoint is selected by the comparison, and is stored in the Z-buffer memory 4. At the same time, a color of the pixel corresponding to the selected Z value is stored in the frame memory 5.

The Z-buffer memory 4 is a memory serving as a work area for the Z-buffer method carried out by the hidden-surface-processing unit 3. In response to a read-out command from the hidden-surface-processing unit 3, a Z value of a pixel at an address indicated by the read-out command is read out and supplied to the hidden-surface-processing unit 3. In response to a write command from the hidden-surface-processing unit 3, a Z value supplied along with the write command is stored in the Z-buffer memory 4 at an indicated address.

The frame memory 5 includes a dual-port memory or a single-port memory having a capacity to store one image. Receiving information on each pixel (e.g., color information) from the hidden-surface-processing unit 3, the frame memory 5 stores this information at an indicated address. Receiving an output command, the frame memory 5 reads out information on each pixel in a raster direction, and supplies the information to the D/A-converter unit 6 for the display on the CRT 7.

As described above, according to the present invention, when the geometric-conversion unit 2 carries out the perspective-conversion process after receiving the scene information and the information on each component, the Z coordinate is divided into a plurality of segments, and Z values are normalized for each space of the divided segments to obtain Z values of the perspective coordinates for polygons constituting the objects. Therefore, the distribution of the Z values are made coarser not only in a region closer to the viewpoint but also in a region more distant from the viewpoint. Namely, without increasing the number of bits for the Z values, the distribution of the Z values is made coarser across the entire depth region. Also, lines are converted into lines and planes are converted into planes when polygon coordinates of each component are converted from the viewpoint coordinate to the perspective coordinates.

Accordingly, an accurate and high-speed comparison of the Z values is made without increasing the volume of the Z-buffer memory.

As described above, according to the present invention, the distribution of the Z values is made coarse in the entire depth range without increasing the number of bits for representing the Z values, so that lines are converted into lines and planes are converted into planes when the polygon coordinates of each component are converted from the view-point coordinates to the perspective coordinates. Therefore, a high-speed and precise comparison of the Z values can be conducted without a need for an increase in the Z-buffer-memory volume.

Further, the present invention is not limited to these embodiments, but various variations and modifications may be made without departing from the scope of the present invention.

What is claimed is:

1. A device for creating an image representing a three-dimensional scene of objects, said device comprising:

a conversion unit which divides a Z axis into a plurality of segments to create a plurality of spaces and normalizes Z values for each of the plurality of spaces to convert view-point coordinates of said objects into perspective coordinates for each of said plurality of spaces; and a hidden-surface processing unit for carrying out hidden-surface processing based on a Z-buffer method by using said perspective coordinates of said objects to create said image.

2. The device as claimed in claim 1, wherein said conversion unit attaches a space number indicating a corresponding one of said plurality of spaces to the normalized perspective coordinates, and wherein said hidden-surface processing unit uses said normalized perspective coordinates with said space number to perform said hidden-surface processing.

3. The device as claimed in claim 2, wherein said space number is provided on the side of the most significant bit in a data structure which represents said normalized perspective coordinates with said space number.

4. The device as claimed in claim 1, further comprising a display unit for displaying said image.

5. The device as claimed in claim 1, wherein said conversion unit converts said view-point coordinates of said objects into said perspective coordinates with respect to all of X, Y, and Z coordinates.

6. A method of creating an image representing a three-dimensional scene of objects, said method comprising the steps of:

a) dividing a Z axis into a plurality of segments to create a plurality of spaces, b) normalizing Z values for each of the plurality of spaces for converting view-point coordinates of said objects into perspective coordinates for each of said plurality of spaces; and c) carrying out hidden-surface processing based on a Z-buffer method by using said perspective coordinates of said objects to create said image.

7. The method as claimed in claim 6, wherein said step b) further comprises the steps of:

attaching a space number indicating a corresponding one of said plurality of spaces to the normalized perspective coordinates, and wherein said step c) uses said normalized perspective coordinates with said space number to perform said hidden-surface processing.

8. The method as claimed in claim 7, wherein said space number is provided on the side of the most significant bit in a data structure which represents said normalized perspective coordinates with said space number.

9. The method as claimed in claim 6, further comprising a step of displaying said image on a display.

10. The method as claimed in claim 6, wherein said step b) converts said view-point coordinates of said objects into said perspective coordinates with respect to all of X, Y, and Z coordinates.

* * * * *